United States Patent
Takane

(10) Patent No.: US 9,905,087 B2
(45) Date of Patent: Feb. 27, 2018

(54) POINT-OF-SALE SYSTEM THAT MEASURES RADIOACTIVITY OF A PRODUCT

(71) Applicant: NEC Platforms, Ltd., Kawasaki-shi, Kanagawa (JP)

(72) Inventor: Hiroyuki Takane, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/374,119

(22) Filed: Dec. 9, 2016

(65) Prior Publication Data
US 2017/0092080 A1 Mar. 30, 2017

Related U.S. Application Data

(63) Continuation of application No. 14/362,235, filed as application No. PCT/JP2012/078549 on Oct. 29, 2012, now abandoned.

(30) Foreign Application Priority Data

Dec. 8, 2011 (JP) ................................ 2011-268732

(51) Int. Cl.
*G07G 1/00* (2006.01)
*G01T 7/12* (2006.01)
*G06K 7/10* (2006.01)

(52) U.S. Cl.
CPC ............. *G07G 1/0054* (2013.01); *G01T 7/12* (2013.01); *G06K 7/10544* (2013.01)

(58) Field of Classification Search
CPC .. G01T 1/12; G01T 1/167; G01T 1/18; G01T 7/12; G01T 7/125; G07G 1/00; G07G 1/0009; G07G 1/0045; G07G 1/0054
(Continued)

(56) References Cited

U.S. PATENT DOCUMENTS

| 4,741,108 A | 5/1988 | Cohen |
| 8,117,071 B1 | 2/2012 | Fitch et al. |

(Continued)

FOREIGN PATENT DOCUMENTS

| JP | 06-22932 U | 3/1994 |
| JP | 2004-252994 A | 9/2004 |

(Continued)

OTHER PUBLICATIONS

International Search Report for PCT/JP2012/078549 dated Dec. 11, 2012.
(Continued)

*Primary Examiner* — Suezu Ellis
(74) *Attorney, Agent, or Firm* — Sughrue Mion, PLLC

(57) ABSTRACT

POS system checks for radioactive contamination of products without increasing any personnel workload. The POS system includes: a storage means for storing a product code and a radioactivity threshold defined for each product code in association with each other; a barcode scanner; a radioactivity measurement part for measuring radioactivity of a product based on a radiation dose emitted from the product; a comparison means for comparing a radioactivity threshold associated with the product code read by the barcode scanner with a radioactivity measurement value measured by the radioactivity measurement part; and alarm an output means for outputting an alarm when the radioactivity measurement value exceeds the radioactivity threshold. The radioactivity measurement part is arranged at such a position that, when the product exists at a scanning position (A) where the product code is read with the barcode scanner, the radioactivity measurement part detects the radioactivity of the product.

5 Claims, 9 Drawing Sheets

(58) Field of Classification Search
USPC ....... 235/383, 385, 375; 705/22, 23; 313/93; 422/71
See application file for complete search history.

(56) References Cited

U.S. PATENT DOCUMENTS

| | | |
|---|---|---|
| 8,211,715 B1 | 7/2012 | Royds |
| 8,747,775 B2 | 6/2014 | Sandvick |
| 2004/0251422 A1 | 12/2004 | Overhoff |
| 2014/0081786 A1 | 3/2014 | Sato |
| 2014/0346227 A1* | 11/2014 | Takane ................. G07G 1/0054 235/383 |

FOREIGN PATENT DOCUMENTS

| | | | | |
|---|---|---|---|---|
| JP | 2011-100371 A | 5/2011 | | |
| JP | 4915709 B1 | 4/2012 | | |
| KR | WO 2017146361 A1 * | 8/2017 | ............. | B07C 5/346 |

OTHER PUBLICATIONS

Written Opinion for PCT/JP2012/078549 dated Dec. 11, 2012.
English-equivalent machine translation of JP 4915709B1, Japan Patent Office, dated Jan. 3, 2016.

* cited by examiner

| PRODUCT CODE | PRODUCT NAME | CLASSIFICATION | UNIT PRICE (YEN) | RADIOACTIVITY THRESHOLD (Bq) | RADIOACTIVITY REFERENCE VALUE (Bq) |
|---|---|---|---|---|---|
| 4910000000001 | WELSH ONION | VEGETABLE | 90 | 8 | 16 |
| 4910000000002 | PORK RIBS | MEAT | 470 | 4 | 8 |
| 4910000000003 | FRESH MILK | MILK | 160 | 4 | 8 |
| ... | | | | | |

PRODUCT REGISTRATION   PLEASE SCAN PRODUCT INFORMATION.

| No. | PRODUCT NAME | PRICE | RADIATION DOSE |
|---|---|---|---|
| 1 | ○○CHOCOLATE | ¥105 | 2Bq |
| | | | |
| | | | |
| | | | |
| | | | |

| RADIATION DOSE | 2Bq |
|---|---|
| RESULT OF DETERMINATION | SAFE |

| NUMBER OF PRODUCTS | 1 |
|---|---|
| CONSUMPTION TAX | ¥5 |
| TOTAL | ¥105 |

| AMOUNT RECEIVED | |
|---|---|
| CHANGE | |

| PRODUCT CODE | PRODUCT NAME | CLASSIFICATION | UNIT PRICE (YEN) | RADIOACTIVITY THRESHOLD (Bq) | RADIOACTIVITY REFERENCE VALUE (Bq) | RADIOACTIVITY MEASUREMENT DETERMINATION FLAG |
|---|---|---|---|---|---|---|
| 4910000000001 | WELSH ONION | VEGETABLE | 90 | 8 | 16 | 1 |
| 4910000000002 | PORK RIBS | MEAT | 470 | 4 | 8 | 1 |
| 4910000000003 | FRESH MILK | MILK | 160 | 4 | 8 | 1 |
| ... | | | | | | |
| 4910000000010 | T SHIRT (S) | CLOTHING | 1000 | 16 | 32 | 1 |
| 4910000000011 | POLO SHIRT (S) | CLOTHING | 1500 | 16 | 32 | 1 |
| ... | | | | | | |
| 4910000000050 | CD CASE | SUNDRIES | 100 | - | - | 0 |
| 4910000000051 | TRASH BOX | SUNDRIES | 500 | - | - | 0 |

POINT-OF-SALE SYSTEM THAT MEASURES RADIOACTIVITY OF A PRODUCT

CROSS REFERENCE TO RELATED APPLICATIONS

This application is a continuation application for U.S. application Ser. No. 14/362,235 filed Jun. 2, 2014, which is a National Stage of International Application No. PCT/JP2012/078549 filed Oct. 29, 2012, claiming priority based on Japanese Patent Application No. 2011-268732, filed Dec. 8, 2011, the contents of all of which are incorporated herein by reference in their entireties.

TECHNICAL FIELD

This invention relates to a point of sales system (POS system) and a POS system control method.

BACKGROUND ART

As a POS system (point of sales management system) installed on a store such as a supermarket, there is known a POS system disclosed in Patent Literature 1, for example.

CITATION LIST

Patent Literature

Patent Literature 1: JP-A-2011-100371

DISCLOSURE OF THE INVENTION

Problem to be Solved by the Invention

However, even if a product is radioactively contaminated, the POS system disclosed in Patent Literature 1 does not have means for checking the radioactive contamination of the product, and thus has such a problem that the radioactive contamination of the product can be checked by neither a store side nor a consumer side.

Moreover, various products such as foods, clothing, residential supplies, and household goods are sold to consumers in stores in the distribution industry. Possibility of radioactive contamination of those products exists in respective steps on a distribution route such as "manufacture of products", "transport of products", "wholesales", "transport", "arrival at store", and "display in store".

This invention solves the conventional problem, and specifically it is an object of this invention to provide a POS system and a POS system control method which enable check of absence/presence of the radioactive contamination of products without an increase in workload imposed on product sales, which is the final stage of the distribution route.

Means to Solve the Problem

In order to solve the above-mentioned problem, according to one embodiment of this invention, there is provided a POS system, including: a storage means for storing a product code for identifying a product and a radioactivity threshold defined for each product code in association with each other; a barcode scanner for reading a product code from a barcode attached to a product; a radioactivity measurement part for measuring radioactivity of the product based on a radiation dose emitted from the product; a comparison means for comparing a radioactivity threshold associated with the product code read by the barcode scanner with a radioactivity measurement value measured by the radioactivity measurement part; and an alarm output means for outputting an alarm when the radioactivity measurement value exceeds the radioactivity threshold, in which the radioactivity measurement part is arranged at such a position that, when the product exists at a scanning position where the product code is read with the barcode scanner, the radioactivity measurement part detects the radioactivity of the product.

In order to solve the above-mentioned problem, according to one embodiment of this invention, there is provided a POS system control method, including: comparing, by a comparison means, a radioactivity threshold associated with a product code of a product read by a barcode scanner with a radioactivity measurement value of the product measured by a radioactivity measurement part, the radioactivity measurement part being arranged at such a position that, when the product exists at a scanning position where the product code is read with the barcode scanner, the radioactivity measurement part detects radioactivity of the product, and being configured to measure the radioactivity of the product based on a radiation dose emitted from the product; and outputting, by an alarm output means, an alarm when the radioactivity measurement value exceeds the radioactivity threshold.

Effect of the Invention

According to one embodiment of this invention, whether or not a subject product is radioactively contaminated can be checked without increasing the workload when the barcode is read by the barcode scanner. Moreover, the possibility of radioactive contamination of the product exists in the respective steps in the distribution route such as "manufacture of products", "transport of products", "wholesales", "transport", "arrival at store", and "display in store". However, in one embodiment of this invention, whether or not the product is radioactively contaminated can be checked when the product is sold, which is the final stage of the distribution route, resulting in surely securing safety of the product sales.

BRIEF DESCRIPTION OF THE DRAWING

FIG. 3 is an explanatory diagram showing an example of a PLU file according to the first embodiment.

FIG. 5 is an explanatory diagram illustrating an example of what is displayed on a display when a product is not radioactively contaminated.

FIG. 8 is an explanatory diagram showing an example of a PLU file according to the third embodiment.

BEST MODE FOR EMBODYING THE INVENTION

Figure 1:
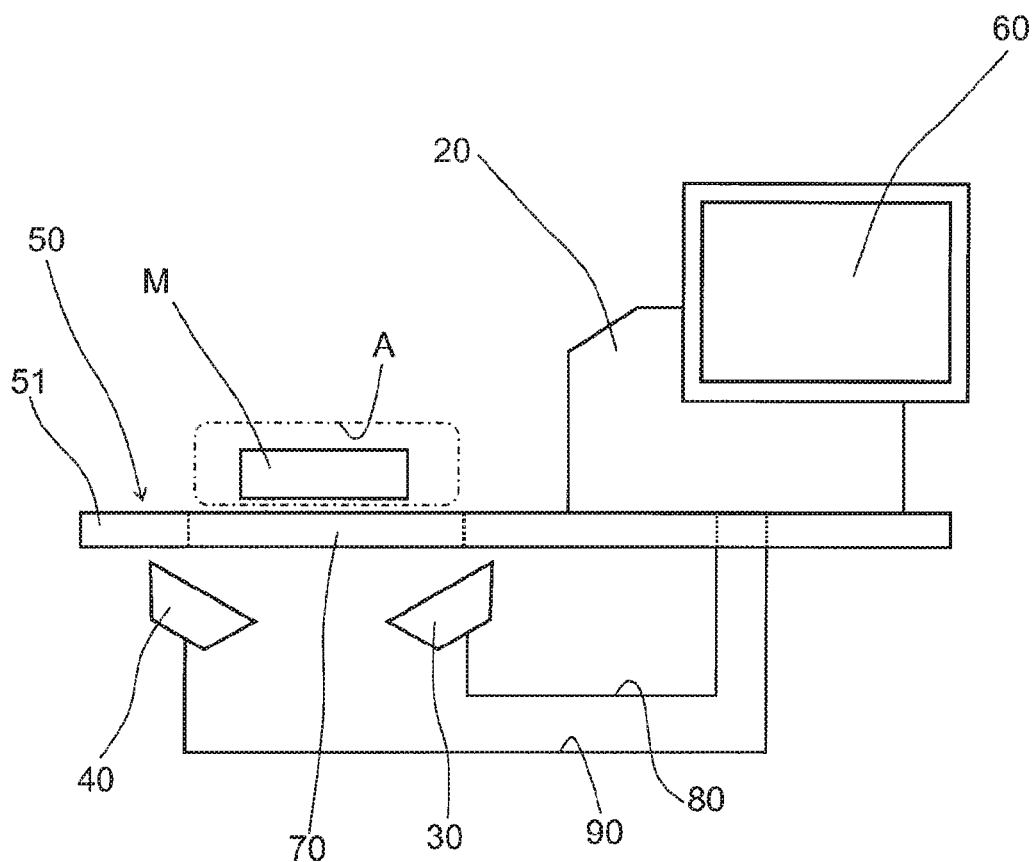
FIG. 1 is a schematic diagram illustrating a hardware configuration of a POS system according to a first embodiment of this invention.
Figure 2:
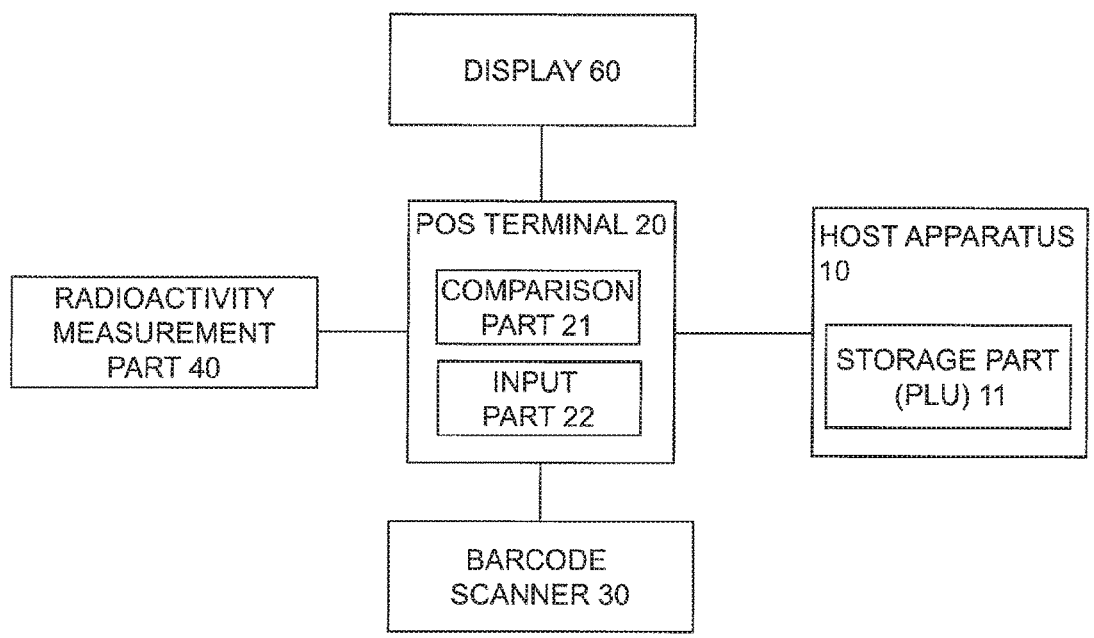
FIG. 2 is a block diagram illustrating the POS system according to the first embodiment.

Now, a description is given of a POS system according to each of a plurality of embodiments of this invention with reference to the accompanying drawings.
Embodiments As illustrated in FIGS. 1 and 2, a POS system according to a first embodiment of this invention includes a host apparatus (POS host) 10, a plurality of POS terminals 20 connected to the host apparatus 10, a barcode scanner 30 connected to each POS terminal 20 to scan a barcode of a product, a radioactivity measurement part 40 connected to each POS terminal 20 to measure the radioactivity of the product, a bagging counter 50 to be used to place a product and the like, a display 60 connected to each POS terminal 20 to display various types of information, and a scanning window 70 fixed to the bagging counter 50.

Note that, a description of an apparatus configuration less relevant to this invention is omitted. Moreover, a device described as a single device in this embodiment may be constructed by a plurality of separate devices, and conversely, respective devices described as a plurality of separate devices in this embodiment may be integrated.

The host apparatus 10 includes a storage part 11, an input part, an output part, a control part, a communication part, and an auxiliary storage apparatus. The control part is constructed by a CPU and the like, and the storage part 11 is constructed by a ROM, a RAM, a hard disk, and the like.

The storage part 11 of the host apparatus 10 stores a price look up (PLU) file, and, in the PLU file according to this embodiment, as exemplified in FIG. 3, a "product name", a "classification", a "unit price", a "radioactivity threshold", and a "radioactivity reference value" are registered in association with a "product code" of each product.

On this occasion, the "radioactivity reference value" means a reference value for radioactivity defined by a country or the like for each product, and the "radioactivity threshold" means a threshold of the radioactivity uniquely defined by a store. The "radioactivity reference values" are defined for respective products, and thus are not uniform. Further, the "radioactivity reference values" are temporarily or eternally reviewed. The "radioactivity threshold" is provided independently of the "radioactivity reference value" in this embodiment, but the "radioactivity reference value" itself may be used as the "radioactivity threshold".

The POS terminal 20 includes a control part, a storage part, a communication part, an auxiliary storage apparatus, and an input part 22 for receiving various types of inputs. The POS terminal 20 realizes respective parts described later by controlling the control part to operate based on software deployed in the storage part. The control part is constructed by a CPU and the like, and the storage part is constructed by a ROM, a RAM, a hard disk, and the like. The POS terminal 20 is connected to the host apparatus 10 via a transmission line such as a LAN. In this embodiment, a keyboard is used to construct the input part 22. However, a specific aspect of the input part 22 is not limited thereto, and for example, a touch panel may be used to construct the input part 22.

The control part of the POS terminal 20 includes a comparison part (comparison means) 21. Although its description is given in detail later, the comparison part 21 compares the "radioactivity threshold" associated with the product code read by the barcode scanner 30 with the "radioactivity measurement value" measured by the radioactivity measurement part 40 to determine whether or not the "radioactivity measurement value" exceeds the "radioactivity threshold". Note that, although the comparison part 21 is provided to the control part of the POS terminal 20 in this embodiment, the comparison part may alternatively be provided to the host apparatus 10, the barcode scanner 30, or the radioactivity measurement part 40.

The barcode scanner 30 reads the product code from the barcode attached to the product. The barcode scanner 30 is constructed as a fixed scanner, which is fixed to the bagging counter 50. As illustrated in FIG. 1, the barcode scanner 30 is arranged on a lower side of the scanning window 70 fixed to the bagging counter 50, and is configured to read, through the scanning window 70, the product code from the barcode of a product M placed at a scanning position A, which is on an upper side of the scanning window 70. The barcode scanner 30 includes a communication part for transmitting/receiving data to/from the POS terminal 20, and is connected to the POS terminal 20 through use of a communication cable 80.

The radioactivity measurement part 40 measures an amount of radioactivity of a product based on a radiation dose emitted from the product. The radioactivity measurement part 40 is constructed as a component separate from the barcode scanner 30, and is arranged at a position different from a position where the barcode scanner 30 is arranged. A well-known geiger-mueller (GM) radiation dosimeter is used to construct the radioactivity measurement part 40. The α rays are blocked even by a material such as paper, and the γ rays exist in a large amount in a general environment, and thus cause a large measurement error. Therefore, in this embodiment, the radioactivity measurement part 40 is configured to detect the β rays, which pass through a general package. Note that, a specific aspect of the radioactivity measurement part 40 is not limited to the above-mentioned GM radiation dosimeter.

As illustrated in FIG. 1, the radioactivity measurement part 40 is arranged at such a position that, when the product M exists at the scanning position A where the product code of the product M can be read with the barcode scanner 30, the radioactivity measurement part 40 can detect the radioactivity of the product M in an optimal manner and can measure an amount of radioactivity of the product M in an optimal manner. In this embodiment, as illustrated in FIG. 1, the radioactivity measurement part 40 is fixed to the bagging counter 50 on the lower side of the scanning window 70. The radioactivity measurement part 40 includes a communication part for transmitting/receiving data to/from the POS terminal 20, and is connected to the POS terminal 20 through use of a communication cable 90.

The bagging counter 50 is a counter to be used to place the product and the like. The bagging counter 50 includes a top board part 51 to be used to place, onto its top surface, the product, a shopping basket into which the products are put, and the POS terminal 20. The scanning window 70 is fitted into a part of the top board part 51 and fixed thereto.

The display 60 is connected to the POS terminal 20 to display various types of information. In this embodiment, one display 60 functioning both as a shop-clerk display and a customer display is connected to the POS terminal 20. However, the use application of the display 60 and the number of the displays 60 are not limited to this example. For example, one shop-clerk display and one customer display may be separately provided to be connected to the POS terminal 20. Alternatively, in a case where the POS terminal 20 is constructed as what is called a self-service POS terminal to be operated by a customer himself/herself to read the barcode and perform checkout processing, only one customer display needs to be connected to the POS terminal 20.

The scanning window 70 is a light-transmissive member to be fitted into the top board part 51. As a specific material of the scanning window 70, any kind of material can be used as long as the material to be used can transmit scanning light of the barcode scanner 30, such as glass and plastic. In addition, in the case where the scanning window 70 is arranged between the scanning position A and the radioactivity measurement part 40 as in this embodiment, as a specific material of the scanning window 70, any kind of material can be used as long as the material to be used can transmit the scanning light of the barcode scanner 30 and transmit the radial rays (in particular, β rays) as well, such as glass and plastic.

Figure 4:
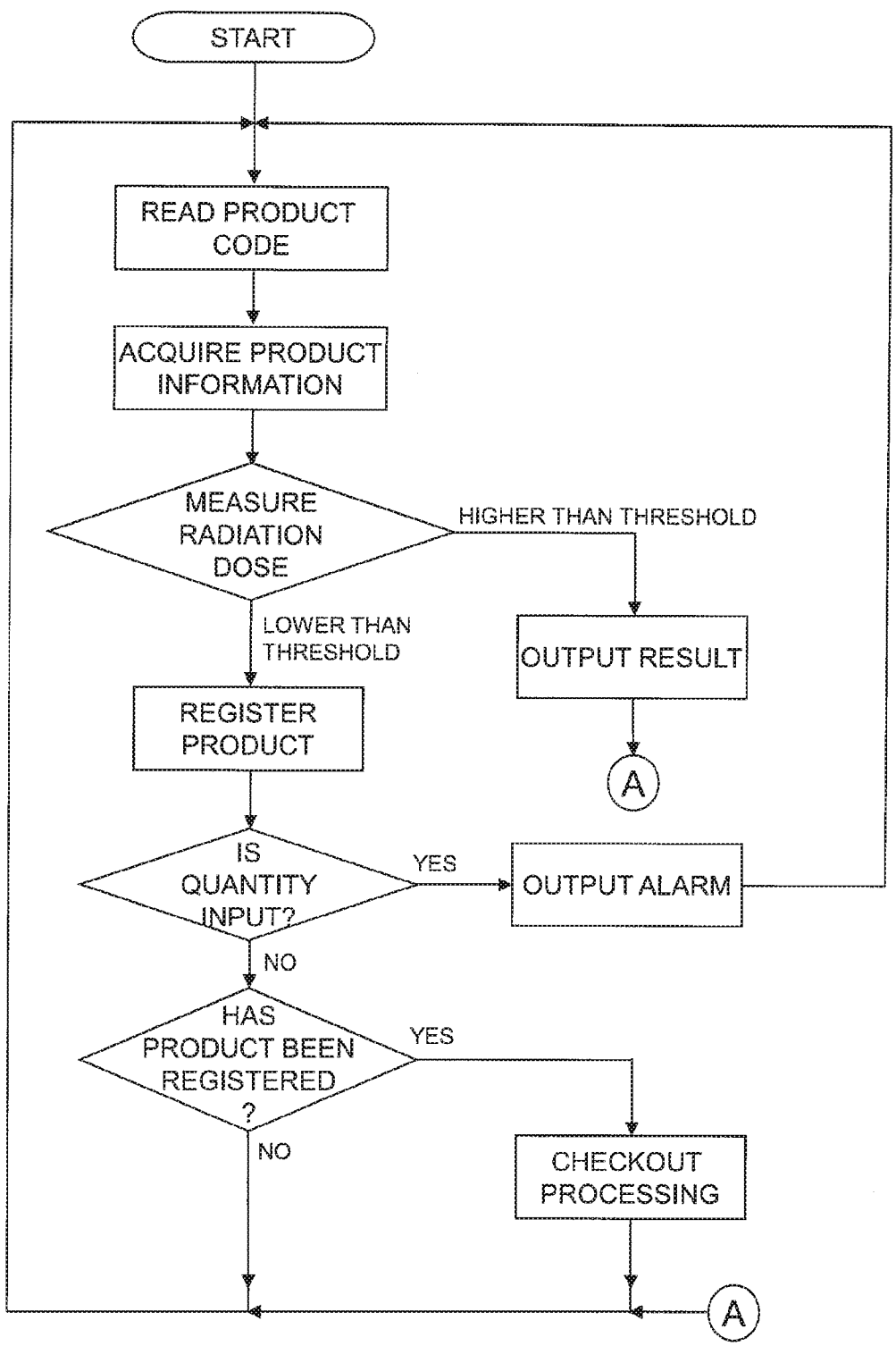
FIG. 4 is a flow chart illustrating a processing flow according to the first embodiment.

Referring to FIG. 4, a description is now given of a processing flow using the POS system according to the first embodiment.

In the POS system according to this embodiment, a "normal mode (mode without measuring the radiation dose" and a "radiation dose measurement mode" can be selected, and FIG. 4 is a processing flow in a case where a shop clerk selects the "radiation dose measurement mode".

First, a product code is read from a barcode attached to a subject product by using the barcode scanner 30.

Then, the POS terminal 20 acquires various types of product information including the "radioactivity threshold" of the subject product from the PLU file stored in the storage part 11 of the host apparatus 10 based on the product code of the subject product read by the barcode scanner 30.

Then, the radioactivity measurement part 40 starts the measurement of a radiation dose emitted from the subject product, thereby measuring the amount of the radioactivity of the subject product. Then, the comparison part 21 of the POS terminal 20 compares the "radioactivity measurement value" measured by the radioactivity measurement part 40 and the "radioactivity threshold" of the subject product acquired from the PLU file with each other (radioactive contamination check step).

In the above description, after the barcode is read by the barcode scanner 30 and the product information is acquired, the radioactivity measurement part 40 measures the radioactivity, and the "radioactivity measurement value" and the "radioactivity threshold" are compared with each other. However, the reading of the barcode by the barcode scanner 30 and the radioactivity measurement by the radioactivity measurement part 40 may be simultaneously carried out, and then, the acquisition of the product information and the comparison between the "radioactivity measurement value" and the "radioactivity threshold" may be carried out.

In the radioactive contamination check step, if the "radioactivity measurement value" exceeds the "radioactivity threshold", product registration for the subject product is not carried out, but an alarm is output.

On this occasion, as an output destination of the alarm, the display 60, an alarm sound output part and an alarm light output part independently provided at arbitrary locations, and the host apparatus 10 are conceivable, and those output destinations including other means may be arbitrarily selected or combined. Moreover, the alarm may be transmitted both to the shop clerk and the customer, or the alarm may be transmitted only to the shop clerk. In the case of a self-service POS terminal, the alarm only needs to be transmitted to the customer. Further, the alarm may be transmitted to a manager of the store or a manager of a store chain in addition to the shop clerk and/or the customer. In this case, the manager side such as the manager of the store and the manager of the store chain can acquire the information on the radioactive contamination of the products, and, for example, can sum up the number of contamination incidents to take an action of changing the suppliers of the products. Moreover, the alarm may not be transmitted to the shop clerk and/or the customer, but be transmitted only to the manager of the store, the manager of the store chain, and the like. In this case, the manager side can acquire the information on the radioactive contamination of the products while disorder on the shop side is avoided. Moreover, as contents of the alarm, such a fact that the "radioactivity measurement value" exceeds the "radioactivity threshold", the "radioactivity measurement value", the "radioactivity threshold", and the "radioactivity reference value", and a massage, an alarm sound, an alarm light, an audio guidance, and a video guidance prompting decontamination of the product or exchange of the product are conceivable, and those contents including other contents may be arbitrarily selected or combined.

Moreover, even if the "radioactivity measurement value" exceeds the "radioactivity threshold" in the radioactive contamination check step, the product registration may be carried out while the alarm is output.

On the other hand, if the "radioactivity measurement value" does not exceed the "radioactivity threshold" in the radioactive contamination check step, the product registration of the product is carried out without outputting the alarm.

On this occasion, in general, if a plurality of the same products are to be registered, the input part 22 is used to input the quantity of the products after the first product is registered. However, in this embodiment, in order to surely measure the radioactivity for all products, if the quantity is input, an alarm is output, and the input of the quantity is invalidated. In order to register a plurality of the same products, the product code reading is carried out for a plurality of times. The processing proceeds to the product code reading after the alarm output in the processing flow illustrated in FIG. 4, but after such a message that "You cannot input quantity of products, and please scan product" may be output, and the processing may proceed to the product code reading after the shop clerk depresses a clear button.

On this occasion, as an output destination of the alarm, the display 60 and an alarm sound output part and an alarm light output part which are independently provided at arbitrary locations are conceivable, and those components including other means may be arbitrarily selected or combined. Moreover, as contents of the alarm, a message, an alarm sound, an alarm light, an audio guidance and a video guidance, each of which notifies the store clerk and/or the customer that the quantity has been input, are conceivable, and those contents including other contents may be arbitrarily selected or combined.

After all the subject products have been registered as the products, the processing then proceeds to the checkout processing.

Note that, in the case where the POS terminal 20 is constructed as the self-service POS terminal, for example, as illustrated in FIG. 5, the "radioactivity measurement value" of the product whose "radioactivity measurement value" does not exceed its "radioactivity threshold" and the fact that this product is safe may be displayed on the display in addition to its "product name" and "unit price" at the time of registration of the product or the checkout processing.

Moreover, in the POS terminal 20 configured so that the store clerk carries out such operations as registration of the products, in a case where the customer display is connected to the POS terminal 20, the POS system may also display, for the product whose "radioactivity measurement value" does not exceed its "radioactivity threshold", items similar to the ones illustrated in FIG. 5 on the customer display.

The POS system according to this embodiment acquired in this way can check whether or not the subject product M is radioactively contaminated with little increase in the workload when the barcode is scanned by the barcode scanner 30 by arranging the radioactivity measurement part 40 at such a position that, when the product M exists at the scanning position A, the radioactivity measurement part 40 detects the radioactivity of the product M in an optimal manner.

Moreover, the possibility of radioactive contamination of the product exists in the respective steps in the distribution route such as "manufacture of products", "transport of products", "wholesales", "transport", "arrival at store", and "display in store". However, according to this embodiment, whether or not the product is radioactively contaminated can be checked when the product is sold, which is the final stage of the distribution route, resulting in surely securing safety of the product sales.

Moreover, if the shop clerk inputs the quantity of products, the alarm is output, and the shop clerk can be forced to measure the radioactivity of all individual products, resulting in an increase in safety of the product sales.

Moreover, according to this embodiment, independently of the "radioactivity reference value" defined by the country or the like, the "radioactivity threshold" stricter than the "radioactivity reference value" is uniquely defined as the threshold for the radioactive contamination, resulting in safer product sales.

Figure 6:
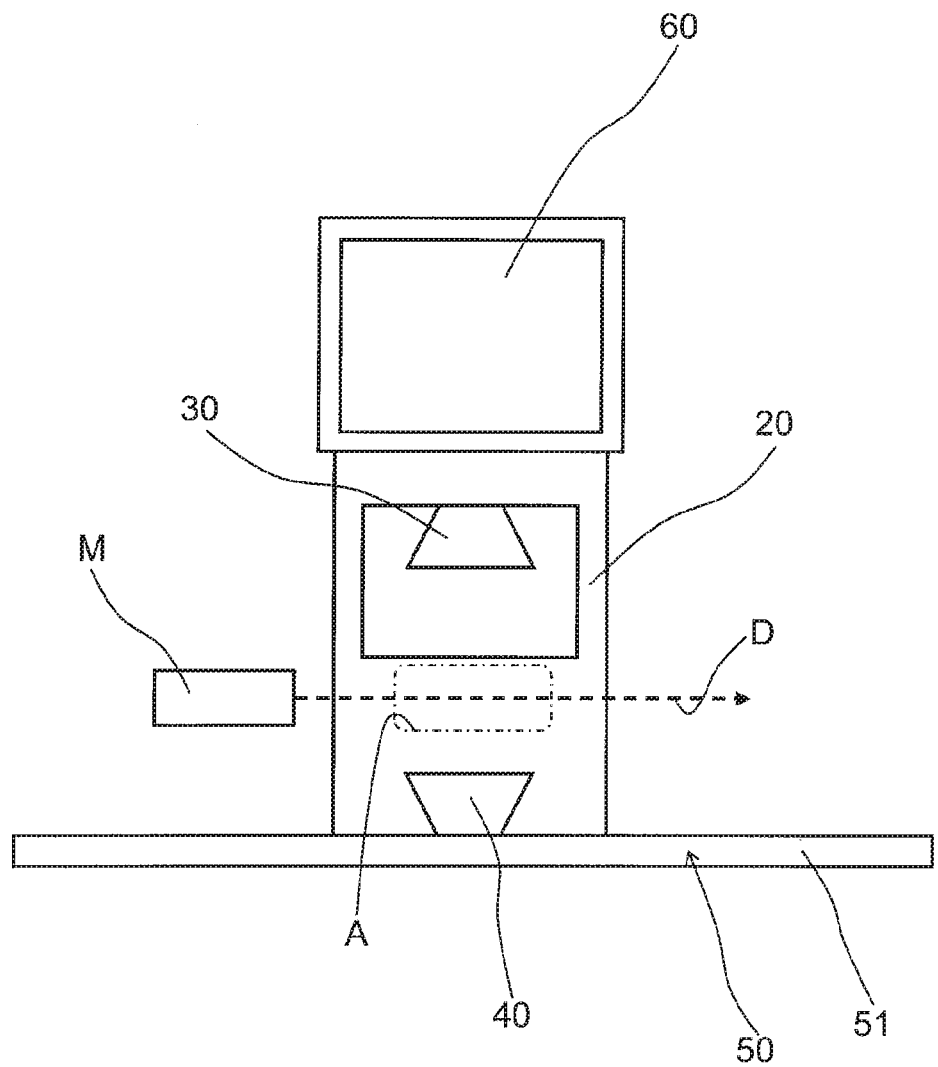
FIG. 6 is a schematic diagram illustrating a hardware configuration of a POS system according to a second embodiment of this invention.

Referring to FIG. 6, a description is next given of a POS system according to a second embodiment of this invention.

The POS system according to the second embodiment of this invention differs from the POS system according to the first embodiment only in how the respective components are arranged, and hence in the following, a description is given only of a difference from the POS system according to the first embodiment.

First, the barcode scanner 30 in the first embodiment is fixed to the bagging counter 50 as illustrated in FIG. 1, but the barcode scanner 30 in the second embodiment is fixed to the POS terminal 20 as illustrated in FIG. 6.

In addition, the radioactivity measurement part 40 in the first embodiment is fixed to the bagging counter 50 as illustrated in FIG. 1, but the radioactivity measurement part 40 in the second embodiment is fixed to the POS terminal 20 as illustrated in FIG. 6. In the second embodiment, the radioactivity measurement part 40 is also arranged at such a position that, when the product M exists at the scanning position A where the product code of the product M can be read with the barcode scanner 30, the radioactivity measurement part 40 can detect the radioactivity of the product M in an optimal manner and can measure the amount of radioactivity of the product M in an optimal manner. Note that, a reference symbol D of FIG. 6 represents a product movement direction in which the product M is to be moved.

In the first and second embodiments described above, a description has been given assuming that the barcode scanner 30 is the fixed scanner, which is fixed to the bagging counter 50 or the POS terminal 20. However, as a specific aspect of the barcode scanner 30, any type of barcode scanner can be used as long as the barcode scanner to be used can read the product code from the barcode attached to the product in a suitable manner. For example, the barcode scanner 30 may be constructed as a handheld scanner (not shown), which is to be held with the hand of a user for use. Note that, in a case where the barcode scanner 30 is constructed as the handheld scanner (not shown), the scanning position A where the product is to be scanned with the barcode scanner 30 is determined in advance, and the radioactivity measurement part 40 is arranged at such a position that, when the product exists at the scanning position A, the radioactivity measurement part 40 can detect the radioactivity of the product in an optimal manner.

In addition, as a specific aspect of the radioactivity measurement part 40, any type of radioactivity measurement part can be used as long as the radioactivity measurement part to be used is arranged at such a position that, when the product exists at the scanning position A, the radioactivity measurement part can detect the radioactivity of the product in an optimal manner.

Figure 7:
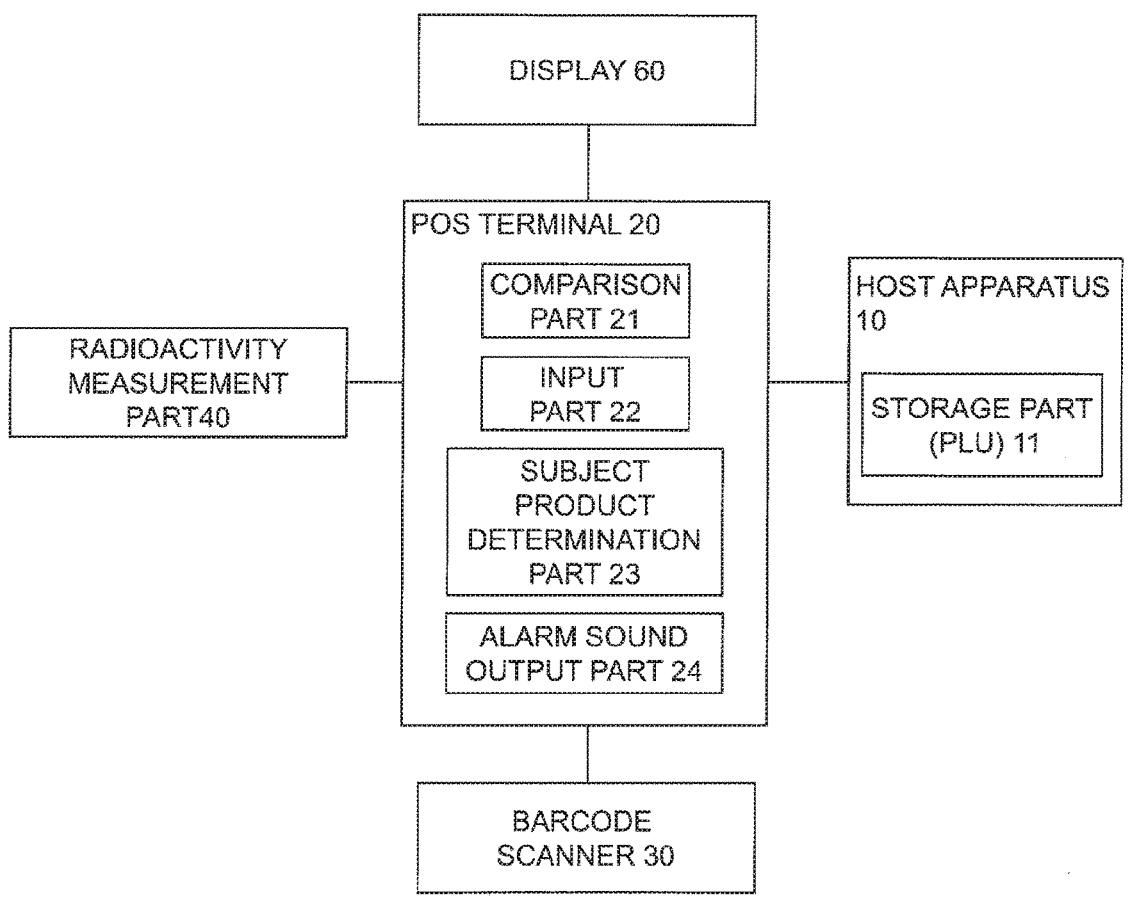
FIG. 7 is a block diagram illustrating a POS system according to a third embodiment of this invention.
Figure 9:
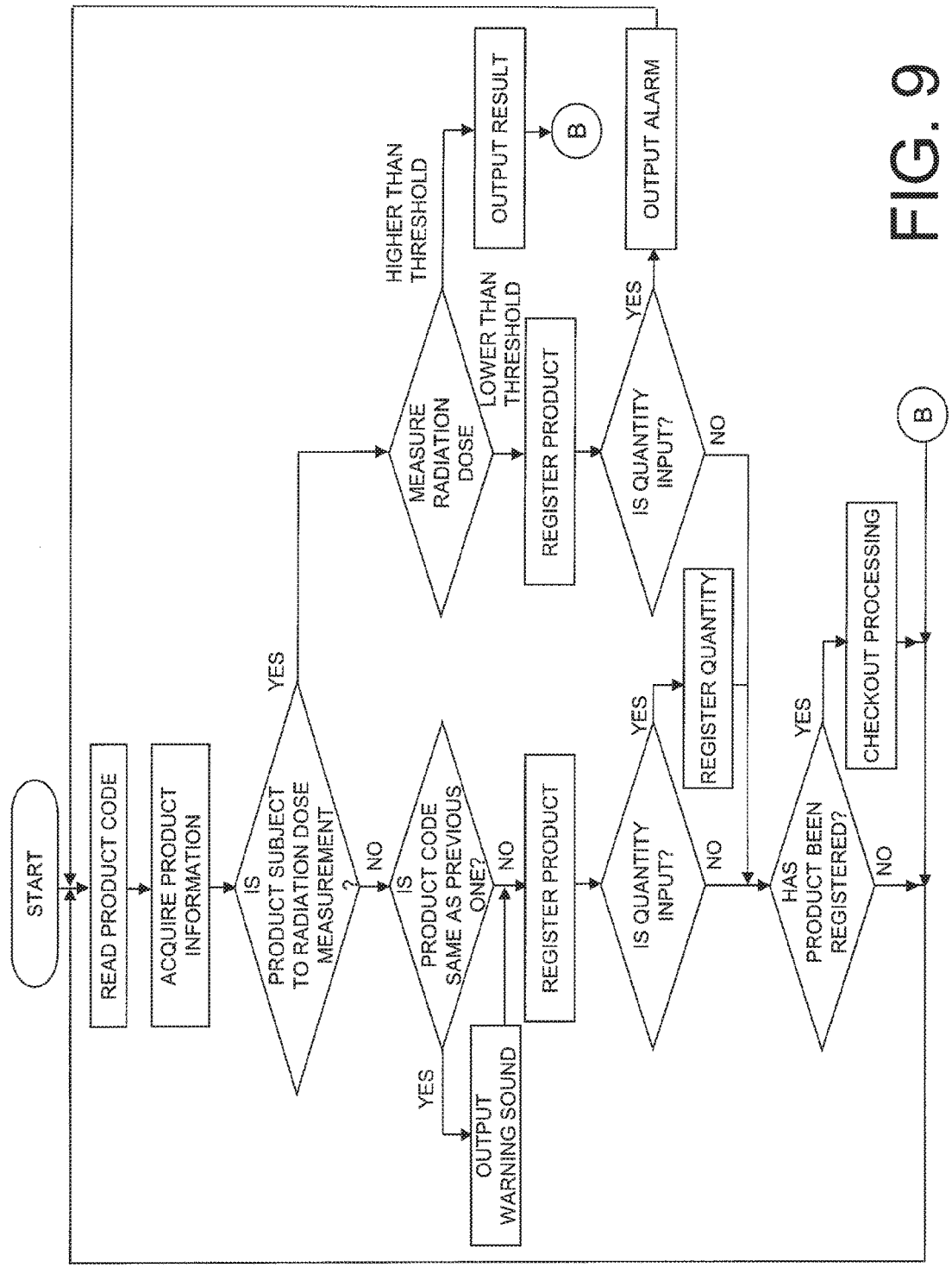
FIG. 9 is a flow chart illustrating a processing flow according to the third embodiment.

Referring to FIGS. 7 to 9, a description is next given of a POS system according to a third embodiment of this invention.

On this occasion, the POS system according to the third embodiment differs from the POS systems according to the first and second embodiments only in a part of the data configuration of the PLU file, and hence in the following, a description is given only of differences from the POS systems according to the first and second embodiments.

First, the POS system according to the third embodiment of this invention registers, in order to limit the subjects of the radioactivity measurement to a part of products, as illustrated in FIG. 8, "radioactivity measurement determination flags" each associated with the "product code" to the PLU file stored in the storage part 11 of the host apparatus 10. In this embodiment, as illustrated in FIG. 8, flags of "1" are assigned to products which are subject to the radioactivity measurement ("Welsh onion" and "T shirt (S)"), and flags "0" are assigned to products which are not subject to the radioactivity measurement ("CD case" and "trash box"), but flags may be assigned to only the products subject to the radioactivity measurement.

Moreover, the control part of the POS terminal 20 further includes a subject product determination part 23 for determining whether or not a product is subject to the radioactivity measurement by using the "radioactivity measurement determination flag". Note that, similarly to the comparison part 21, the subject product determination part 23 may be provided on the host apparatus 10, the barcode scanner 30, or the radioactivity measurement part 40.

Moreover, an alarm sound output part 24 for outputting an alarm sound is further provided on the POS terminal 20. Note that, the alarm sound output part 24 may be provided on the host apparatus 10, the barcode scanner 30, or the radioactivity measurement part 40.

Moreover, as illustrated in FIG. 9, the following difference occurs between the first and second embodiments and the third embodiment also in terms of the processing flow of the POS system.

Specifically, in the third embodiment, after the barcode scanner 30 reads the barcode, and the product information is acquired, a step of determining whether or not the product is subject to the radioactivity measurement is included. For example, in this embodiment, as illustrated in FIG. 8, "Welsh onion" and "T shirt (S)" are subject to the radioactivity measurement, but "CD case" and "trash box" are not subject to the radioactivity measurement.

Then, in the step, when it is determined that the product is subject to the radioactivity measurement, as illustrated in FIG. 9, similarly to the first and second embodiments, it is determined whether or not the radioactive contamination of the product is present. Moreover, when the product is subject to the radioactivity measurement, in order to surely measure the radioactivity of all the products, if the quantity of the products is input, the quantity input is invalidated by outputting an alarm. When the product is subject to the radioactivity measurement, in order to register a plurality of the same products, the reading of the product code is carried out for a plurality of times. The processing proceeds to the product code reading after the alarm output in the processing flow, but after such a message that "You cannot input quantity of products, and please scan product" may be output, and the processing may proceed to the product code reading after the shop clerk depresses the clear button.

On the other hand, in this step, when it is determined that the product is not subject to the radioactivity measurement, as illustrated in FIG. 9, it is determined whether or not the product code of a previous product and the product code of the product under processing are the same, and if the product codes are the same, a warning sound is output from the alarm sound output part 24. Specific alarm output means to be used when the product code of the previous product and the product code of the product under processing are the same is not limited to the alarm sound output part 24.

Then, if the product is not subject to the radioactivity measurement, as illustrated in FIG. 9, the quantity input of the products is received as necessary, which is different from the case where the product is subject to the radioactivity measurement.

The POS system according to this embodiment acquired in this way can limit, in addition to the effects of the first and second embodiments, the subjects of the radioactivity measurement to a part of products.

This application claims priority from Japanese Patent Application No. 2011-268732, filed on Dec. 8, 2011, the entire disclosure of which is incorporated herein by reference.

REFERENCE SIGNS LIST 10 host apparatus
11 storage part (storage means)
20 POS terminal
21 comparison part (comparison means)
22 input part (quantity input means)
23 subject product determination part
24 alarm sound output part
30 barcode scanner
40 radioactivity measurement part
50 bagging counter
51 top board part
60 display
70 scanning window
80 communication cable
90 communication cable
A scanning position
M product
D product movement direction

What is claimed is:

1. A point of sale (POS) system, comprising:
a memory configured to store a price look up (PLU) file, wherein the PLU file is registered with a product code for identifying a product and a radioactivity threshold which is the product information defined for each product code in association with each other;
a bagging counter to place the product;
a scanning window fixed to the bagging counter;
a barcode scanner configured to generate a scanning light and to read, via the scanning window, the product code from a barcode attached to the product;
a radioactivity measurement part configured to measure, via the scanning window, radioactivity of the product based on a radiation dose emitted from the product placed on the bagging counter;
a processor configured to compare the radioactivity threshold which is associated with the product code read by the barcode scanner and which is acquired from the PLU file with a radioactivity measurement value measured by the radioactivity measurement part;
an alarm output part configured to output an alarm when the radioactivity measurement value exceeds the radioactivity threshold; and
wherein the barcode scanner and the radioactivity measurement part are arranged on one and another ends of a lower side of the scanning window, respectively,
wherein the radioactivity measurement part is arranged at such a position that, when the product exists at a scanning position where the product code is read with the barcode scanner, the radioactivity measurement part detects the radioactivity of the product,
wherein the radioactivity measurement part is a dosimeter which detects $\beta$ rays;
wherein the dosimeter is fixed to the bagging counter at a location remote from the barcode scanner, and
wherein the scanning window is made of a light-transmissive member so as to transmit the scanning light and the $\beta$ rays.

2. The POS system according to claim 1, further comprising:
a user input interface configured to receive an input of a quantity of the product,
wherein, in response to the product being measured by the radioactivity measurement part at substantially a same time as a quantity being inputted via the user interface, the processor invalidates the input quantity.

3. The POS system according to claim 1, wherein the alarm output part comprises a display configured to display the alarm.

4. The POS system according to claim 1, wherein the alarm output part comprises a display having a speaker configured to output a sound for the alarm.

5. A method of detecting radioactivity of a product in a point of sale (POS) system, comprising:
storing, in a memory, a price look up (PLU) file, where the PLU file is registered with a product code for identifying a product and a radioactivity threshold which is product information defined for each product code in association with each other;
reading, by a barcode scanner through a scanning window fixed to a bagging counter, the product code from a barcode attached to the product;
measuring, by a radioactivity measurement part through the scanning window, radioactivity of the product based on a radiation dose emitted from the product placed on the bagging counter;
comparing, by a processor, the radioactivity threshold which is associated with the product code read by the barcode scanner and which is acquired from the PLU file with a radioactivity measurement value measured by the radioactivity measurement part; and outputting an alarm based on the comparison,
wherein, in response to the measurement value exceeding the radioactivity threshold, the alarm is output via one of a speaker and a display, and
wherein the measuring of the radioactivity of the product and the reading of the barcode of the product are performed at substantially a same time,
wherein the barcode scanner and the radioactivity measurement part are arranged on one and another ends of a lower side of the scanning window, respectively,
wherein the radioactivity measurement part is a dosimeter which detects β rays,
wherein the dosimeter is fixed to the bagging counter at a location remote from the barcode scanner, and
wherein the scanning window is made of a light-transmissive member so as to transmit a scanning light of the barcode scanner and the β rays.

* * * * *